United States Patent Office 3,525,379
Patented Aug. 25, 1970

3,525,379
FOUNDRY COMPOSITIONS, CORES AND METHOD OF MAKING SAME
Calvin Keith Johnson, Palos Heights, and David Ray Armbruster, Addison, Ill., assignors to CPC International Inc., a corporation of Delaware
No Drawing. Filed Apr. 18, 1968, Ser. No. 722,210
Int. Cl. B22c 9/12, 1/22
U.S. Cl. 164—16                                13 Claims

ABSTRACT OF THE DISCLOSURE

Self-supporting, handleable foundry cores are made by a process which comprises coating sand or other refractory material with a mixture of a curing catalyst and a resin binder of resorcinol resins, phenolic resorcinol resins, or certain ethylene urea terminated resins characterized by the formula:

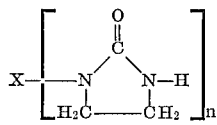

wherein X is an organic structure having a molecular weight between about 100 and 5,000 and $n$ is greater than 1. The coated sand is then shaped into a foundry core and contacted for about 2 to about 60 seconds at room temperature or above with an aldehyde containing gas. Such contact cures the resin binder and thereby forms a strong and useable foundry core.

BACKGROUND OF THE INVENTION

For simplicity, the term "core" will be used hereinafter as encompassing casting forms generally. That is to say, this term as used herein is applicable in its generic sense to mean a casting form which includes both molds and cores, the following discussion and invention, hereinafter described, not being limited to formation of the latter. Similarly, the word "pattern" as used herein includes both mold patterns and coreboxes and is not limited to either the former or the latter term.

Foundry cores used in making metal castings are normally prepared from a composition of sand or other refractory materials and a curable or polymerizable binder coated on the refractory particles. The purpose of this binder coating is to permit the mixture to be hardened after it is first shaped or molded into a desired form. Shaping of the composition, which usually comprises a major amount of sand and a minor amount of binder, is accomplished through ramming, blowing, or otherwise introducing the mixture into a pattern to thereby assume the shape defined by the adjacent surfaces of the pattern. Then, by using a catalyst or polymerization accelerator introduced before or after the sand mix has been introduced into the pattern, and/or by using heat, the binder is caused to cure, thereby converting the shaped foundry mix into a hard, solid foundry core. This curing is usually accomplished either in the original pattern, in a gassing chamber, or in a holding pattern. Commonly used binders include such materials as phenol-formaldehyde resins, urea formaldehyde resins, furfuryl alcohol modified urea formaldehyde resins, drying oils and urethane oils.

Generally speaking two basic techniques exist in the art for effecting a cure once the sand-binder mixture is shaped. The first of these techniques is a thermosetting process wherein heat is used to effect hardening of the binder. Although such a technique allows for high speed automatic core and pattern production (i.e. hardening in 10–45 seconds), it has many problems attendant with it. For example, the addition of heat is an added expense to the system as a whole. The high temperatures required, which usually are from about 350° F.–500° F., necessitate the use of special metal patterns adapted to withstand these temperatures and thus are expensive to make and difficult to maintain. Furthermore, automatic core machinery used in the art is difficult to maintain at these elevated temperatures. Should the machinery break down, it is often necessary to let the machinery cool in order to make repairs. Cooling time obviously causes long and expensive delays in production.

In order to alleviate the problems attendant with the thermo-setting technique of curing foundry cores, the art has developed a second technique known as a no-bake or cold-setting process. As its name implies such a process is carried out at room temperatures or slightly above, i.e. 45°–120° F. and more often between 60°–90° F. Through the use of these low temperatures, the problems of the thermosetting technique as set forth above are virtually eliminated. However, because of the use of low temperatures, the main advantage of high temperature use, i.e., speed of curing, is materially curtailed. Other disadvantages also plague this process. For example, in the typical no-bake process, useable strengths are only achieved after about 30 minutes and usually closer to 60 minutes after the no-bake resin is mixed with sand and a catalyst. As compared to 10–45 seconds when using the thermosetting process, such a time lapse represents a material lag or slow-down of production. In addition, the resins heretofore developed by the art which may be cured at these relatively low temperatures may suffer from a lack of tensile strength, short bench life of foundry mixes, etc.

Several no-bake processes have been developed in relatively recent years which have been able to achieve reasonably good production speeds and tensile strengths at room temperature. One example is known as the carbon dioxide ($CO_2$) process. In this process, an aqueous solution of sodium silicate is coated on sand as a binder. When $CO_2$ is passed through these sand compositions, the cores harden rapidly. The major disadvantage of foundry cores prepared by this process is their poor collapsibility and shake-out after the metal has been poured into and solidified in the pattern. Also, sodium silicate bonded cores tend to generate considerable gas during the casting operation.

Other examples of a rapidly setting no-bake process are described in the prior art. For example, in one prior art process, a urea formaldehyde binder is mixed with sand. The mixture is then shaped and rapidly cured when gassed at room temperature with strong acids or gases that form strong acids on exposure to moisture. In another prior art process, vinyl-ether sand compositions are formed into cores and rapidly cured in a matter of a few seconds by gassing at room temperature with a strong acid. The major disadvantage of employing these latter two processes is that the gaseous strong acids are very corrosive and thus tend to damage the equipment used to effect the process.

From an analysis of the above, it becomes quite evident that the need exists in the foundry core art for a system of making cores which is rapid, which at the same time imparts useable strengths to the cores without the need for high temperatures, and which forms a foundry core with good shake-out and collapsibility characteristics without the use of corrosive gasses or excessive generation of gases by the binder during casting.

SUMMARY OF THE INVENTION

This invention contemplates a system for making foundry cores which rapidly imparts useable strengths to the green cores without the need of high temperatures, corrosive gases, or the use of binder resins that excessively generate gases during metal casting. The foundry cores so formed by this system exhibit good shake-out and collapsibility characteristics.

Rapid formation of foundry cores as described above is brought about by a unique process which basically comprises mixing any ordinary sand or other refractory material with a catalyst and a curable binder selected from the group consisting of a resorcinol resin, a phenolic-resorcinol resin and an ethylene urea terminated resin, placing the mixture in a pattern of the desired shape by any suitable means, treating the "green" core at room temperature or higher for a short period of time with a gaseous aldehyde or a mixture of gases containing aldehyde vapors, and separating the self-supporting foundry core from the pattern. The core so produced exhibits excellent shake-out and collapsibility characteristics and does not excessively generate gas when used in metal casting systems.

DETAILED DESCRIPTION OF THE INVENTION INCLUDING PREFERRED EMBODIMENTS

As set forth above, this invention contemplates within its scope novel foundry cores formed by a unique process which basically comprises forming a mixture of any ordinary sand or other refractory material with a curing catalyst and a curable binder selected from the group consisting of a resorcinol resin, a phenolic-resorcinol resin, and an ethylene urea terminated resin, placing the mixture in a pattern (i.e. corebox or mold) of the desired shape, treating the "green" core at room temperature or higher for a short period of time, generally from about 2 to about 60 seconds, with an aldehyde-containing gas such as a gaseous aldehyde or a mixture of gases containing aldehyde vapors, and separating the self-supporting foundry core from the pattern.

Conventional resorcinol-formaldehyde or phenolic-resorcinol-formaldehyde resins may be employed as binders for the sand or other refractory material in this invention. Resins of this type are well known in the art. The resorcinol-formaldehyde resins are generally made by condensing about 0.4 to about 0.9 mole of formaldehyde with one mole of resorcinol to give a water-soluble product. The phenolic-resorcinol-formaldehyde resins are generally prepared by reacting an excess of formaldehyde, usually from about 1.2 to about 3.0 moles of formaldehyde with one mole of phenol or substituted phenol using basic catalysts. To the resulting resole resin is added about one mole or more of resorcinol per mole of formaldehyde used to make the resole and the mixture is acidified. The mixture is then heated until all of the free methylol groups have reacted with the resorcinol or self-condensed. These resins are normally prepared in water solution. The solutions may be diluted with water or other solvents or concentrated to give any desired solids and/or viscosity range.

The ethylene urea terminated resins useful in the invention contain unreacted ethylene urea >NH groups in the molecule and may be characterized by the general formula:

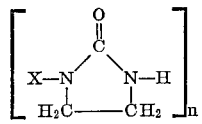

wherein X is a low molecular weight organic group or a polymeric material (i.e. an organic structure) having a molecular weight between about 14 and 5,000 and $n$ is more than one. Generally $n$ is preferably from 2 to 5 but may be in certain instances as high as 15 or 20. Particularly useful within this broad but special group of ethylene urea terminated resins is that class of resins and compounds prepared by condensing mono or poly aromatic or aliphatic aldehydes with an excess of ethylene urea. More than one mole and usually between about 1.5 to 2.5 moles of ethylene urea are used per mole of aldehyde group. In those instances when dialdehydes are used, usually between about 3.0 moles to about 5.0 moles of ethylene urea are used per mole of dialdehyde.

Some examples of aldehydes which may be used to prepare ethylene urea resins useful in this invention include, among others, formaldehyde, paraformaldehyde, acetaldehyde, benzaldehyde, propionaldehyde, butyraldehyde, furfural, terephthalaldehyde, crotonaldehyde, acrolein, glyoxal, and glutaraldehyde. Particularly useful aldehydes are formaldehyde, glyoxal, and glutaraldehyde.

Another class of ethylene urea terminated resins within the broad but special group described above which are useful in this invention are phenolic ethylene urea terminated resins. These resins may also be characterized by the above formula wherein X is a phenolic structure having a molecular weight of from about 100 to about 5,000 and $n$ is at least 2. These resins may be prepared in a three step process which comprises first condensing a mono or polyhydric phenol with one or more, and usually between 1.5 and 3.0 moles of an aldehyde per mole of phenolic hydroxyl group with the aid of an inorganic base (e.g. NaOH) or organic tertiary amine catalyst to give a resole resin. Next an excess of ethylene urea is added to the resole and the mixture is acidified. Preferably between about 0.6 and 1.5 moles of ethylene urea are employed per mole of aldehyde (e.g. formaldehyde) used in the preparation of the resole resin in the first step. Finally the ethylene urea and the resole are condensed usually with the aid of heat to give an ethylene urea terminated phenolic resin.

The resole resins produced in the first step of the above-described process are well known in the art. Examples of the mono or polyhydric phenols which may be used to form these resoles include hydroxybenzene, methylphenol, ethylphenol, p-butylphenol, o-isopropylphenol, p-allylphenol, acetylphenol, 4,4'-dihydroxydiphenylmethane, and 2,2'-dihydroxydiphenylmethane. Examples of the aldehydes which may be used are formaldehyde, acetaldehyde, dialdehydes such as glyoxal and the like. The preferred resole for use in this invention is condensed from hydroxy benzene and formaldehyde.

For purposes of this invention other urea compounds having two or more reactive >NH groups may be mixed with the above described ethylene urea terminated resins to replace part of the ethylene urea in the synthesis of these resins. Examples of such ureas include acetylene diurea, propylene urea, hydantoin, 4,5-dihydroxyethylene urea and triazone. It is also understood that the binders of this invention need not be a single resin but rather may be a combination of the different types of resins. For example, mixtures of resorcinol resins or phenolic resorcinol resins and ethylene urea terminated resins may be used quite effectively.

The catalysts which are used in this invention to aid in the curing of the above-described resins include strong organic or inorganic acids. Examples of such acids are sulfuric acid, hydrochloric acid, perchloric acid, phosphoric acid, polyphosphoric acid, boron trifluoride, boron trifluoride etherate, trifluoroacetic acid, trichloroacetic acid, hydrobromic acid, p-toluenesulfonic acid, sulfurous acid and aluminum chloride. Sulfuric acid is an especially preferred catalyst.

Any conventional sand or other refractory material may be used in this invention. Examples of some sands which may be used are Ottawa sand, Lake sand, Berkeley Float sand, Muskegan Bank sand, Vassar sand, and Zircon sand. Such sand may also be optionally mixed with other ingredients such as iron oxide, ground flax fibers, wood flour, cereal, pitch and the like. Examples of other refractories are aluminum oxide, aluminum silicates, and the like.

The first step in forming foundry cores by the unique process of this invention is to form a mixture of sand or other refractory material with a catalyst and one or more binder resins as described above. This is usually accomplished by thoroughly mixing in standard mulling or mixing equipment the refractory material with from about 0.001% to about 0.4% by weight of a strong acid catalyst based upon the dry weight of refractory material. To this premixture is then added from about 0.5% to 10% and preferably 1% to 4% of the curable binder resin based upon the dry weight of refractory material used. The resulting composition is then thoroughly mulled or mixed until both the resin and catalyst are evenly coated on the refractory material. Alternately, the reactive binder may be coated onto the sand first and then the acid catalyst mulled into this composition. It is also possible to premix the acid catalyst and the resin and to then mull these mixtures into the refractory material.

As an aid to achieving good coating, the viscosity and solids content of the resins prior to coating can be controlled by the amount of solvent placed in the resin. Such control can be used to effect differing amounts of coating, distribution, etc. Unreactive solvents that are useful in this invention include water, dimethyl formamide, dimethylsulfoxide, sulfolane, N-methyl acetamide, and dioxane. Solvents which slowly react with these resins in the presence of an acid catalyst may also be used. An example of such a solvent is furfural alcohol. Such reactive solvents contribute to the final strength of the cured cores.

The next step in the unique process of this invention is to take the coated refractory material mixture formed in the first step and place it in a pattern (i.e. corebox or mold) of a desired shape by any suitable mechanism such as by manual or mechanical ramming or by pneumatic spraying or blowing. Other conventional techniques may also be used. The shaped "green" core so formed in the pattern by this step is then treated with a gaseous aldehyde or a mixture of gases containing aldehyde vapors at room temperature or higher if desired for a period of time sufficient to impart handleable strength to the core by curing the binder resin.

The time of treatment when using the novel technique recited above is extremely short. At room temperature, and depending upon the binder used etc., curing to a sufficient degree to impart handleable strength to a core usually takes from about 2 to about 60 seconds. This time may be decreased or the resulting strength increased if temperatures slightly above room temperature, but not so high as to adversely affect the equipment or pattern, are used. By "room temperature" is meant temperatures ranging from about 60° F. to about 90° F. Temperatures slightly above room temperature which may be used are from about 90° F. to about 160° F. or slightly higher depending upon the equipment etc. being used.

The treatment of a "green" core by contacting it with an aldehyde containing gas as contemplated by this invention may be done in a variety of modes and forms. Generally speaking this treatment comprises passing a gaseous aldehyde or a mixture of gases containing aldehyde vapors through a green (i.e. uncured) core to cure and harden the composition. As stated above, curing and hardening occurs almost instantaneously (i.e. in about 2 seconds) and the core may be removed from the pattern right after the gassing step is completed.

The actual gassing of a core may be done with any conventional equipment or by any conventional technique. The preferred method of gassing involves passing a current of air or inert gas, e.g. nitrogen, through or over a liquid aldehyde to provide a gas mixture saturated with aldehyde vapor. This gaseous mixture is then blown through the core. Although pressures equal to atmospheric pressure may be used, pressures up to about 300 lb. per square inch may be used since it is important that the gas permeate throughout the core. An excess of aldehyde gas may be used without deleterious effects on the hardness and strengths of the cores. The liquid aldehydes may be heated to increase their vapor pressure and the warm gas blown into the core. Alternately, the aldehyde vapors may be passed through the cores without the aid of a carrier gas. In those instances where formaldehyde is used, paraformaldehyde is pyrolyzed and the hot formaldehyde gas passed directly into the sand cores.

In addition to formaldehyde, a variety of aldehydes or mixtures of aldehydes may be used to gas the core compositions of this invention. Particularly useful are acetaldehyde, propionaldehyde, butyraldehyde, acrolein, and crotonaldehyde. The preferred aldehyde is acetaldehyde.

When aldehyde saturated air vapors are used in the process of this invention, it may be advantageous to add small amounts of inhibitors to the aldehyde to prevent autoxidation of the aldehydes to the corresponding carboxylic acids. Examples of useful inhibitors are hydroquinone, quinone, dinitrobenzene, and α-napthol. Other conventional inhibitors may also be used.

It may also be advantageous in some instances when using the technique of this invention to flush the hardened core with air or other inert gas or to place the core in a vacuum to remove the excess aldehyde which may remain in the core after gassing. This reduces the problems of toxicity and odor associated with the subsequent handling of the hardened foundry cores.

The cores prepared in accordance with the above unique process of this invention are rendered hard and handleable at room temperatures in extremely short periods of time. Additional strength may be added if desired merely by allowing the cores to stand for a further short period of time at room temperature. The cores, after being stripped from their pattern may also be further strengthened if desired by post-baking. Other modifications of the above invention will become obvious to the skilled artisan once given the teachings found herein. For example, various additives may be incorporated into the core compositions of this invention to improve certain properties, although they are not needed for the satisfactory operation of this invention. Oxidation inhibitors for certain metals, such as $KBF_4$ and sulfur, may be incorporated to prevent the oxidation of molten magnesium. Also polyacrylamide and acrylamide co-polymers may be added to improve core strengths. Likewise, glycols and low molecular weight polyols may be incorporated into these systems.

Foundry cores made from the above-disclosed compositions according to the above-described techniques are rapidly-produced economic cores useful for casting most all metals. These cores generally exhibit good to excellent shake-out characteristics.

The following examples are presented for illustrative purposes only and are not meant as limitations on this invention. All parts are by weight unless otherwise specified.

EXAMPLE I

One hundred fifty parts of phenol, 120 parts of 37% formalin and 4 parts of a 50% water solution of NaOH were charged into a 3-necked flask equipped with a stirrer, thermometer and reflux condenser. Heat was applied to the flask until a temperature of 65° C. was obtained. The reaction temperature was held at 65° C. until there was no free formaldehyde. This resole was then adjusted to a pH of 2.0 with a 15% water solution of HCl, after cooling to 25° C. One hundred fifty parts of resorcinol was then added and dissolved in the resole. This resole and resorcinol mixture was reacted by heating to 100° C. at a rate of 1° C. per minute. The prepolymer was cooled to 25° C. after holding at 100° C. for 15 minutes. The pH was adjusted to 5.2 with a 25% water solution of NaOH. This final product had a solids content of 76% and refractive index of 1.594 at 25° C.

EXAMPLE II

One hundred twenty parts of phenol, 170 parts of 37% formalin and 6 parts of a 50% water solution of NaOH were charged into a three-necked flask equipped with a stirrer, thermometer and reflux condenser. Heat was applied to the flask until a temperature of 75° C. was reached. The reaction temperature was then held until the free formaldehyde of the resin fell to 2%. This resole was then cooled to 25° C. and adjusted to a pH of 4.5 with a 15% water solution of HCl. One hundred ninety parts of ethylene urea was then added to the resole, and the batch heated to 95° C. at a rate of 1° C. per minute. This reaction temperature was held for 2 hours. The resin was then cooled to 25° C. and the pH adjusted to 7.0 with a 25% water solution of NaOH. The resin was then dehydrated at 29 inches of vacuum until it had a viscosity of 950 cps. at 25° C. The final product had a solids content of 78% and a refractive index of 1.538 at 25° C.

EXAMPLE III

One hundred and fifty parts of phenol, 389 parts of 37% formalin and 121 parts of a 50% water solution of NaOH were charged into a 3-necked flask equipped with a stirrer and thermometer. Heat was applied to the flask until a temperature of 40° C. was reached. This reaction temperature was then held at 40° C. until the free formaldehyde of the resin fell to 2%. This resole was then neutralized with $H_3PO_4$ to a pH of 7.0. The salt that formed was then removed by filtration and the resole dehydrated to a refractive index of 1.580 at 25° C. Three hundred parts by weight of this resole, 110 parts by weight of water and 325 parts by weight of ethylene urea, were charged into a three-necked flask equipped with a stirrer and thermometer and heated to 40° C. The ethylene urea was allowed to dissolve and the pH of this mixture was then adjusted to 2.25 with a 15% water solution of HCl.

Heat was applied to the flask to raise the temperature to 95° C. at 1° C. per minute. This reaction temperature of 95° C. was maintained for 1 hour. The pre-polymer was then cooled and dehydrated at 29 inches of vacuum to a 25° C. viscosity of 850 cps. This final product had a solids content of 75% and a refractive index of 1.529 at 25° C.

EXAMPLE IV

A prepolymer identical to Example III was prepared and then stripped under vacuum to a solids content of 96%. This product was then dissolved in sufficient furfuryl alcohol to give a product with a 25° C. viscosity of 2,000 cps.

EXAMPLE V

Two hundred parts of ethylene urea were dissolved in 200 parts of water. This solution was adjusted to a pH of 2.3 with a 37% water solution of HCl and charged into a three-necked flask equipped with a stirrer, thermometer and separation funnel. Heat was applied to the flask and the temperature taken to 75° C. Ninety-four parts of 37% formalin were added over a period of 10 minutes. During this addition time, the batch temperature rose to 90° C. due to an exothermic heat of reaction. Heat was applied to the flask to maintain the temperature at 90° C. for 25 minutes. The prepolymer was then cooled to 40° C. and dehydrated under vacuum to a 25° C. viscosity of 920 cps.

EXAMPLE VI

Three hundred forty four parts of ethylene urea were dissolved in two hundred ninety parts of a 20% aqueous glyoxal solution and the pH adjusted to 8.5 with sodium hydroxide the reaction mixture exothermed from 25° C. to 55° C. and a precipitate formed.

Sufficient water was added to give a stirrable slurry and the pH was adjusted to a pH of 2.3 with dilute HCl. The mixture was reacted at 100° C. for one-half hour and then dehydrated to a 25° C. viscosity of 1,260 cps.

The resins (prepolymers) formed in Examples I to VI were formed into 2% coatings based upon the weight of refractory material using Ottawa 57AFS Silica sand as the refractory material. The techniques as above described were used wherein the hereinafter specified catalyst was first coated on the sand using a Hobart N–50 mixer. The resin binder was then added to the sand and coated. The coated sand was then formed into 1-inch tensile test cores using a Dietert No. 754–A sand Rammer. These cores were gassed with aldehydes by bubbling air through the aldehyde and passing this aldehyde-saturated air into the core using a Dietert No. 655 Gassing Fixture. No heating of the pattern etc. was done so that the curing was effected at substantially room temperature except in the instance of formaldehyde which was obtained by pyrolyzing paraformaldehyde at 370° F. and thus heated as it contacted the room temperature sand composition. These test cores were then removed from the pattern (in this instance a corebox) and broken on a Tinius Olsen Testing Machine to determine the stripping strength. Cores were also allowed to stand two hours after gassing before determining their tensile strengths. The following results were recorded:

Table I

Samples consisting of 2 parts of resin (prepolymer) and 0.2 part of sulfuric acid coated on 98 parts of sand were gassed for 15 seconds with acetaldehyde at substantially room temperature.

| | | | | | | |
|---|---|---|---|---|---|---|
| (A) Prepolymer from Example No. | I | II | III | IV | V | VI |
| (B) Stripping strength after 15 seconds in p.s.i. | 8 | 21 | 28 | 9 | 7 | 38 |
| (C) After standing 2 hrs. following gassing in p.s.i. | 17 | 100 | 175 | 178 | 310 | 57 |

Table II

Samples containing 2 parts of the prepolymer of Example III and 0.2 part of sulfuric acid coated on 98 parts of sand were contacted for 15 seconds with the aldehyde gas as indicated. Except for formaldehyde the gases were at substantially room temperature.

| Aldehyde | Stripping strength after 15 seconds in p.s.i. | 2 hour stand strength in p.s.i. |
|---|---|---|
| (1) Acetaldehyde | 28 | 175 |
| (2) Propionaldehyde | <5 | 100 |
| (3) Crotonaldehyde | 19 | 132 |
| (4) Acrolein | 14 | 95 |
| (5) Formaldehyde (obtained by pyrolyzing paraformaldehyde at 370° F.) | <5 | 30 |

Table III

Samples containing 2 parts of the prepolymer of Example III and 98 parts of sand with different catalysts were gassed for 15 seconds with acetaldehyde.

| Catalyst | Percent catalyst based on polymer | Stripping strength after 15 seconds in p.s.i. | 2 hour strength in p.s.i. |
|---|---|---|---|
| (1) $H_2SO_4$ | 10 | 28 | 175 |
| (2) 37% HCl | 15 | 26 | 120 |
| (3) $BF_3O(C_2H_5)_2$ | 12 | 18 | 100 |

While the invention has been described in connection with specific embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:
I claim:
1. A method of making shaped articles such as foundry cores, comprising:
   (a) forming a mixture of: a particulate refractory material; a curable resin binder selected from the group consisting of a resorcinol resin, a phenolic resorcinol resin, an ethylene urea terminated resin characterized by the formula

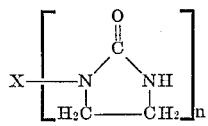

wherein X is an organic structure having a molecular weight of from about 14 to about 5000 and $n$ is greater than 1, and mixtures thereof; and a catalyst for the resin binder;
   (b) forming the mixture into a desired shape, and then
   (c) contacting the shaped mixture with an aldehyde-containing gas for a sufficient period of time to cure the resin binder and to impart handleable strength to the resulting hardened shape.

2. A method according to claim 1 wherein said catalyst is a strong acid catalyst selected from the group consisting of sulfuric acid, hydrochloric acid, perchloric acid, phosphoric acid, polyphosphoric acid, boron trifluoride, boron trifluoride etherate, trifluoroacetic acid, trichloroacetic acid, hydrobromic acid, p-toluenesulfonic acid, sulfurous acid, and aluminum chloride.

3. A method according to claim 1 wherein the aldehyde of said aldehyde-containing gas is selected from the group consisting of acetaldehyde, formaldehyde, propionaldehyde, butyraldehyde, acrolein, crotonaldehyde, and mixtures thereof.

4. A method according to claim 1 wherein said aldehyde-containing gas is a gaseous aldehyde.

5. A method according to claim 1 wherein said aldehyde-containing gas is a mixture of gases containing aldehyde vapors.

6. A method according to claim 1 wherein the contacting of the mixture with the aldehyde-containing gas is effected by blowing said gas through the mixture at pressures up to about 300 lb. per square inch.

7. A method according to claim 1 wherein said aldehyde-containing gas is a mixture of air saturated with an admixture of an aldehyde vapor and an inhibitor which prevents autoxidation of the aldehyde to its corresponding carboxylic acid.

8. A method according to claim 1 wherein said aldehyde-containing gas is hot formaldehyde gas obtained from the pyrolysis of paraformaldehyde.

9. A method according to claim 1 wherein said aldehyde-containing gas is a mixture of a gaseous aldehyde and an inert gas.

10. A method according to claim 1 wherein said mixture comprises from about 0.001% to about 0.4% of an acid catalyst and from about 0.5% to about 10% of said curable resin binder, both based upon the weight of the particulate refractory material.

11. A method according to claim 10 wherein said mixture is contacted with said aldehyde-containing gas for from about 2 to about 60 seconds.

12. A method according to claim 11 wherein said resin is a phenolic ethylene urea terminated resin.

13. A method according to claim 1 wherein said resin binder is first dissolved in furfuryl alcohol and then mixed with said refractory material.

References Cited
UNITED STATES PATENTS

| | | | |
|---|---|---|---|
| 3,107,403 | 10/1963 | Moore | 164—43 X |
| 3,145,438 | 8/1964 | Kottke et al. | 164—16 |
| 3,184,814 | 5/1965 | Brown | 164—12 |

J. SPENCER OVERHOLSER, Primary Examiner

J. E. ROETHEL, Assistant Examiner

U.S. Cl. X.R.

164—43; 260—54, 70